(No Model.)
C. E. WILSON.
PLOW ATTACHMENT, &c.
No. 451,966. Patented May 12, 1891.
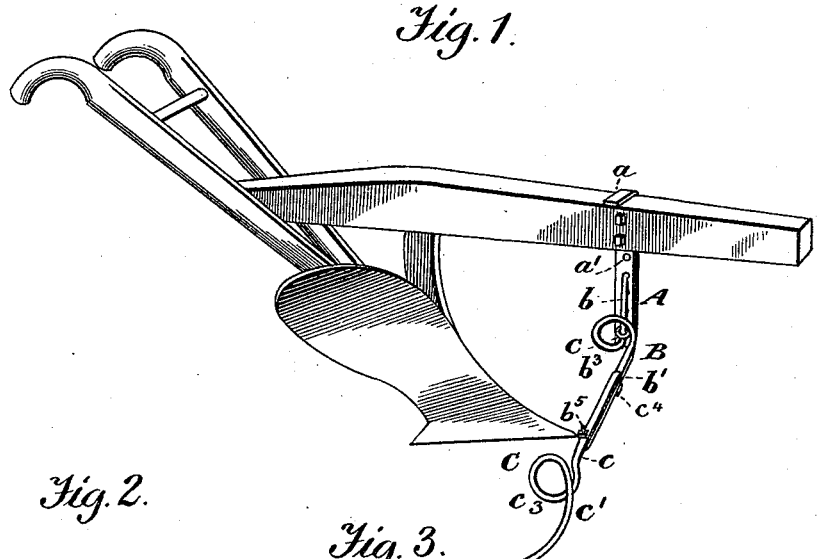
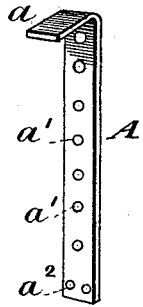
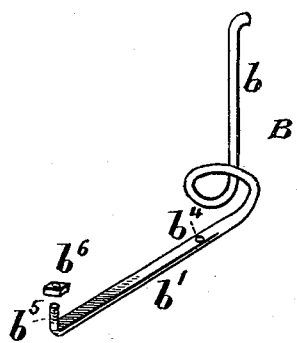
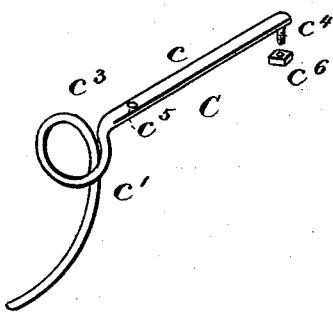
Witnesses.
A. Ruppert,
H. A. Daniels
Inventor.
Charles E. Wilson
Per
Thomas P. Simpson
Atty

UNITED STATES PATENT OFFICE.

CHARLES EMBERSON WILSON, OF THOMASVILLE, TENNESSEE.

PLOW ATTACHMENT, &c.

SPECIFICATION forming part of Letters Patent No. 451,966, dated May 12, 1891.

Application filed October 4, 1890. Serial No. 367,094. (No model.)

*To all whom it may concern:*

Be it known that I, CHARLES EMBERSON WILSON, a citizen of the United States, residing at Thomasville, in the county of Cheatham and State of Tennessee, have invented certain new and useful Improvements in Plow Attachments for Turning Under Weeds or other Vegetable Matter; and I do hereby declare the following to be a full, clear, and exact description of the invention, such as will enable others skilled in the art to which it appertains to make and use the same.

The invention relates to turn-plows; and it consists in the particular means described for enabling the plow to turn under and cover up weeds, grass, or other vegetable growth.

In the drawings, Figure 1 is a perspective view of a turn-plow with my invention attached thereto. Fig. 2 is a detail view of the plate which is attached to the beam of plow; Fig. 3, a detail view of the wire spring which is adjustably attached to said plate, and Fig. 4 a detail view of a second wire spring which is adjustably attached to the first one.

My turn-plow attachment consists of the plate A and the two spring-wires B C. The plate A has the end flange $a$ at right angles to the body thereof, the series of holes $a'$, and the two holes $a^2$ $a^2$ to receive the ends of a clamp C, which holds down the arm $b$ of the the wire B, whose bent end $b^2$ is passed into one of the holes $a'$. The wire B has between the arms $b$ $b'$ a spring-coil $b^3$. The wire C has also two arms $c$ $c'$ and an intermediate spring-coil $c^3$. It also has an integral end pin $c^4$, which fits in the hole $b^4$ of wire B, and a hole $c^5$, which receives the end pin $b^5$ of the other wire, the arms $b'$ $c'$ being made flat to facilitate the making of said holes. The pins $b^5$ $c^5$ are end-threaded to receive taps $b^6$ $c^6$ to fasten the wires securely together. By means of the holes $a'$ in plate A the device may be regulated with respect to the plow.

It will be observed that my weed-turner works just over or a little beyond the point of the plow and runs on the furrow-slice about to be turned over with the left end in the open furrow. The device going over the weeds mashes them down before the plow and they are carried over with a twist, so as to lie under the furrow-slice.

What I claim as new is—

A weed and grass turner consisting of the beam-plate A and the spring-wires B C, all constructed and adapted to operate as and for the purpose set forth.

In testimony whereof I affix my signature in presence of two witnesses.

CHARLES EMBERSON WILSON.

Witnesses:
W. J. BASFORD,
J. T. WILSON.